US011782873B2

(12) United States Patent
Shur et al.

(10) Patent No.: US 11,782,873 B2
(45) Date of Patent: Oct. 10, 2023

(54) SYSTEM AND METHOD FOR MANAGING TIMESERIES DATA

(71) Applicant: eMeter Corporation, Foster City, CA (US)

(72) Inventors: Elena Shur, San Jose, CA (US); Tan Li, Danville, CA (US); Thaddeus Jimenez, Foster City, CA (US); Brad Johnson, Mountain View, CA (US)

(73) Assignee: eMeter Corporation, Foster City, CA (US)

( * ) Notice: Subject to any disclaimer, the term of this patent is extended or adjusted under 35 U.S.C. 154(b) by 329 days.

(21) Appl. No.: 17/095,340

(22) Filed: Nov. 11, 2020

(65) Prior Publication Data

US 2022/0147486 A1 May 12, 2022

(51) Int. Cl.
 *G06F 16/11* (2019.01)
(52) U.S. Cl.
 CPC .................... *G06F 16/113* (2019.01)
(58) Field of Classification Search
 CPC .................................................. G06F 16/113
 See application file for complete search history.

(56) References Cited

U.S. PATENT DOCUMENTS

| | | | |
|---|---|---|---|
| 2016/0110403 A1* | 4/2016 | Lomet ................. | G06F 16/2255 707/695 |
| 2016/0378753 A1 | 12/2016 | Taylor et al. | |
| 2017/0329828 A1* | 11/2017 | Gupta ................. | G06F 16/9535 |
| 2018/0246950 A1 | 8/2018 | Arye et al. | |
| 2018/0349230 A1* | 12/2018 | Gupta ................. | G06F 11/1451 |
| 2020/0379774 A1* | 12/2020 | Alperovich ......... | G06F 12/0804 |
| 2021/0034598 A1* | 2/2021 | Arye ..................... | G06F 16/288 |
| 2021/0133046 A1* | 5/2021 | Yadav ................. | G06F 16/2358 |

OTHER PUBLICATIONS

Oracle: "Best Practices For Implementing High Volume IoT workloads with Oracle Database 12c Enabling Global Scale IoT"; Apr. 30, 2017 (Apr. 30, 2017), XP055892185; URL:https://www.oracle.com/cn/a/tech/docs/wp-bp-for-iot-with-12c-042017-3679918.pdf, 25 pages.
PCT Search Report dated Feb. 28, 2022, for PCT Application No. PCT/US2021/058899, 16 pages.

* cited by examiner

*Primary Examiner* — Tamara T Kyle
*Assistant Examiner* — Lahcen Ennaji (57) ABSTRACT

There is described a system and method for managing timeseries data. A timeseries consumer receives timeseries data from multiple devices, provides the timeseries data to a particular partition of a data table based on an insert time of the timeseries data to the data table, and records metadata associated with the timeseries data provided to the particular partition at a track table. A timeseries archiver identifies recent records of the data table based on insert time(s) and archival time(s) of a milestone table, archives the timeseries data of the data table associated with the recent records to an external system, and updates the archival time(s) of the milestone table and the track table. The timeseries purger drops an archived partition of the data table based on determining that all records of the archived partition have been archived.

24 Claims, 5 Drawing Sheets

| Device ID (208) | Measurement ID (210) | Insert Time (212) | Read Time (214) | Org Time (216) | Timeseries Values (218) | | |
|---|---|---|---|---|---|---|---|
| | | | | | 1 | ... | N |
| | | | | | 1 | ... | N |

| Device ID (228) | Insert Time (230) | Archival Time (232) |
|---|---|---|
| | | |
| | | |

| Device ID (248) | Measurement ID (250) | Read Time (252) | Insert Time (254) | Archival Time (256) |
|---|---|---|---|---|
| | | | | |
| | | | | |

SYSTEM AND METHOD FOR MANAGING TIMESERIES DATA

FIELD OF THE INVENTION

This application relates to the field of data processing systems and, more particularly, to datastores used to process large volumes of timeseries data.

BACKGROUND

Data processing systems are commonly used for enterprise applications, such as order processing, sales processing, and financial transactions. Certain types of data processing systems are designed to handle high volumes of data input. In order to process the data, datastores of the data processing systems may consume a lot of time and energy in order to accumulate and archive the incoming data, for instance, in batches multiple times a day. In addition, the data should be removed from the datastore after being archived for efficient operation.

Meter data management (MDM) and other smart grid solutions handle large volumes of real time measurements generated by residential and commercial energy meters to address a variety of needs, such as billing processes, advanced analytics, meter device management, and accurate customer reporting. Conventional MDM approaches organize meter reads based on read time for persistent out-of-order late arriving reads as well as row-wise deletion statements after each meter data archival. These conventional approaches require immense system resources which equate to more CPU usage and costly storage solution in order to handle the high volume of data. Also, the deletion of records from the datastore consumes a lot of resources and negatively impacts performance. Due to this inefficient processing of data based on read time, a massive amount of processing cores and memory resources may be required and costly, particularly where data integrity and preservation are important.

SUMMARY

In accordance with one embodiment of the disclosure, there is provided an efficient high volume data querying, processing, and purging approach for data processing systems. The approach includes a highly efficient organization of maintaining timeseries data based on insert time, instead of read time, implemented by data partitioning by insert time. The organization, i.e., a datastore, includes a database engine that supports partition drop. The approach also utilizes a separate table to track and manage the dropping of data. As a result, the approach provides the benefits of reducing the number of queries, necessary CPU resources, data removal task through partition drop, and I/O load on storage (thus allowing for less expensive storage solution). Data integrity is maximized while data loss is minimized or avoided.

One example of a data processing system that would benefit from this approach is a meter data management (MDM) platform. The MDM platform may be based on a domain specific energy industry model and provide device, grid, and market operations associated with the energy industry. The MDM platform may process data in near real time from millions of distributed grid assets and smart devices, allowing for meter data management, grid optimization and analytics, distributed energy management, energy market participation, and asset management. A front end processor (FEP) for an MDM platform provides processes, schema, and data flow techniques to facilitate the ingestion of high-speed interval data from smart meters, sensors and other devices. The FEP utilizes big data and fast event processing to support a wide array of use cases such as real time load monitoring, dynamic energy production/consumption forecasting, distribution generation, and the like.

One aspect is a system for managing timeseries data comprising a timeseries consumer, a timeseries archiver, and a timeseries purger. The timeseries consumer is configured to receive timeseries data from multiple devices, provide the timeseries data to a particular partition of multiple partitions of a data table based on an insert time of the timeseries data to the data table, and record metadata associated with the timeseries data provided to the particular partition at a track table with an initial insert value in the track table set to support responsive data archival. The timeseries archiver is configured to identify recent records of the data table based on one or more insert times and one or more archival times of a milestone table, archive the timeseries data of the data table associated with the recent records to an external system, and update the archival time(s) of the milestone table and the track table. The timeseries purger is configured to drop an archived partition of the data table based on determining that all records of the archived partition have been archived.

Another aspect is a method for managing time series data. Timeseries data is received from a plurality of devices. The timeseries data is provided to a particular partition of multiple partitions of a data table based on an insert time of the timeseries data to the data table. Metadata associated with the timeseries data is recorded at a track table with an initial insert value in the track table set to support responsive data archival in response to providing the timeseries data to the particular partition. Recent records of the data table are identified based on one or more insert times and one or more archival times of a milestone table. The timeseries data of the data table associated with the recent records is archived to an external system. The archival times of the milestone table and the track table are updated in response to archiving the timeseries data of the data table. An archived partition of the data table is dropped in response to determining that all records of the archived partition have been archived.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate high volume data querying (i.e., archiving) and purging will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
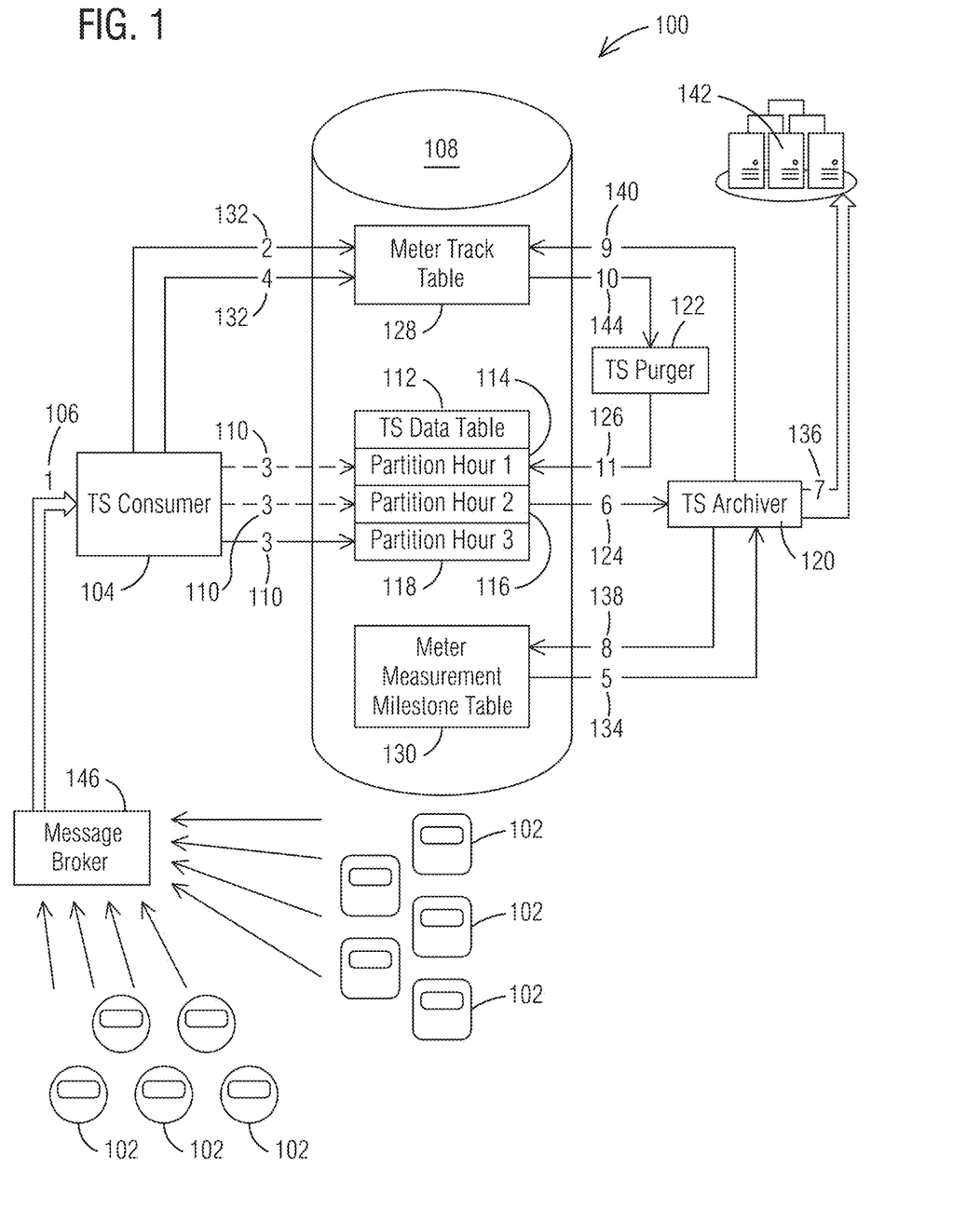
FIG. 1 is an illustration of a data processing system in an example implementation that is operable to employ techniques described herein.

Referring to FIG. 1, there is shown a data processing system 100 in an example implementation that is operable to employ techniques described herein. The data processing system 100 includes multiple devices 102, such as energy meters, in which each device captures measurements and publishes timeseries data based on the measurements in real time. A timeseries consumer 104 collect the timeseries data from the devices 102 via an incoming network link 106 and provide the timeseries data to a datastore 108 of the system 100 via an incoming storage link 110. The datastore 108 includes a database engine that supports partition drop. The timeseries data is accumulated and written to a timeseries data table ("data table") 112 of the datastore 108 in batches. For example, the timeseries consumer 104 may transmit the timeseries data to the data table 112 multiples times a minute, hour, day, week, and the like. In addition, the timeseries data may be stored in a select partition 114, 116, 118 of the data table 112 in which each partition is distinguished by an insert time. The timeseries consumer 104 may write to a first partition 114 during a first time period, a second partition 116 during a second time period, and another partition 118 during a subsequent time period. For example, timeseries data may be recorded and indexed at the partitions 114, 116, 118 based on insert time by minute, hour, day, week, and the like.

The timeseries data of the data table 112 is archived over time by a timeseries archiver 120 and removed from the data table by a timeseries purger 122 after being archived. In particular, the timeseries archiver 120 retrieves the timeseries data from a partition 114, 116, 118 of the data table 112 via an outgoing storage link 124. Also, since the datastore 108 includes a database engine that supports partition drop, the timeseries purger 120 provides a command to the datastore 108 via an outgoing purge link 126 to drop one or more partitions 112, 114, 116 in which all timeseries data of the partition(s) have been archived. The data processing system 100 is particularly effective for a large volume of data since dropping partitions from the data table 112 is more efficient, i.e., consumes less resources and minimizes impact on overall performance, than the conventional approach of deleting records. The system 100 meets the requirements for the real time data ingestion while efficiently utilizing CPU core usage and memory resources, thus minimizing cost.

The datastore 108 includes the timeseries data table ("data table") 112, a meter track table ("track table") 128, and a meter measurement milestone table ("milestone table") 130. The data table 112 includes timeseries data for all devices 102 and measurements thereof in which the records of the data table are continually inserted, queried, and removed from the data table. The timeseries data is organized in the data table 112 by partition in a way to allow robust, highly efficient and scalable operations for data ingestion, querying and removal. The timeseries data is stored in the data table 112 partitioned by record insert time ("insert time"), by a particular time range, and indexed by record insert time and timeseries read time. The track table 128 is used to track data ingestion and archival per meter. The data processing system 100 determines a time limit before which timeseries data may be removed, checks the track table 128 to ensure that all meter data for that time limit had been archived, and drops partitions 114, 116, 118 up to that time limit.

Specifically, the timeseries data is partitioned in the data table 112 of the datastore 108 by insert time, which increases in value over time. In particular, each partition 114, 116, 118 of the data table 112 is associated with a particular time range in which timeseries data, received from the devices 104, is inserted into the particular partition. For example, the first partition 114 may include all timeseries data received and inserted during a first time period, the second partition 116 may include all timeseries data received and inserted during a second time period, and another partition 118 may include all timeseries data received and inserted during a subsequent time period. The partitions 114, 116, 118 may be distinguished by associated time ranges based on minutes, hours, days, weeks, months, and the like.

The timeseries data table ("data table") 112, the meter track table ("track table") 128, and the meter measurement milestone table ("milestone table") 130 are utilized by the data processing system 100 in coordination with each other. The insert time of the most recent archived timeseries data is logged by the track table 128 and tracked by the milestone table 130 as a milestone to avoid repeated querying. New timeseries data from the timeseries consumer 104 is not written to already archived partitions as these records will have a greater (i.e., later) insert time which will be associated with a different partition. The timeseries data is removed by dropping partitions for those time ranges in which all timeseries data has been archived. The process of dropping a partition consumes significantly fewer processing resources than deleting records since the data processing system 100 ensures that the partition is safe to drop and minimizes the need for recovery logs.

As described above and shown in FIG. 1, the data processing system 100 includes the timeseries consumer 104, the datastore 108, the timeseries archiver 120, and the timeseries purger 122. The timeseries consumer 104 performs the function of ingesting incoming timeseries data messages originating from devices 102, received via the incoming network link 106. The timeseries consumer 104 also provides new timeseries records to the track table 128 via one or more first incoming track links 132, and updates existing records and device information to the data table 112 via one or more incoming storage links 110. The timeseries archiver 120 performs the function of archiving persisted timeseries data stored at the datastore 108. The timeseries purger 122 is a service to drop or otherwise remove archived data from the datastore 108.

The timeseries consumer 104, the datastore 108, the timeseries archiver 120, and the timeseries purger 122 coordinate operations for archiving and purging timeseries data of the datastore 108. Devices 102 may be configured with different channels, each of which reports its timeseries data on its own schedule. The reporting time for the devices 102 or channels varies, where some may report data immediately and continuously whereas others may not report any data for long periods of time. The devices 102 may report data with current read times, past read times, or both. The timeseries consumer 104 collects the incoming timeseries data, or messages including the data, and provides the timeseries data to the data table 112 via incoming storage link 110. In view of the above, the timeseries archiver 120 archives timeseries data per meter on a configured schedule. If a device 102 does not report any data since the last archival, the timeseries archiver 120 does not archive any timeseries data for the device. If there was an error detected in archiving timeseries data, the error is recorded and/or reported and the timeseries archiver 120 does not archive the timeseries data for the meter. During the next scheduled archival round, the data is again queried for all the devices 102. After the archival, timeseries data may be maintained in the datastore 108 for a configured period, after which the timeseries purger 112 may drop a partition of the timeseries data as described herein.

The timeseries archiver 120 archives timeseries data on a configured schedule stored at the datastore 108 or the timeseries archiver 120. The timeseries archiver 120 receives timeseries data and archival data from the data table 112 via an outgoing storage link 124 and archival data from the milestone table 130 via incoming archive link 134. The configured schedule may be predetermined by an operator or system user, such as minutes, hours, days, weeks, months, and the like. For example, the timeseries archiver 102 may run often, such as every hour, or seldom, such as once a day. The timeseries archiver 102 may also be inactive for a period of time, such as several days, due to a system maintenance or other events. The timeseries archiver 120 archives data per device ID based on the data read time values. The timeseries archiver 120 queries the data table 112 once per device ID, retrieves records for all measurements, archives the retrieved data via outgoing network link 136, and then updates the milestone table 130 via outgoing archive link 138 and the track table 128 via a second incoming track link 140. The milestone archival time is the most recent insert timestamp value of the archived records, and the track archival time is the oldest timestamp value. When archiving the timeseries data via the outgoing network link 136, the timeseries archiver 120 may provide the data to an external system 142. Examples of external systems 142 include, but are not limited to, such as an external file, an external module, a data feed message (such as Kafka or TCP/IP), or a different datastore entirely, etc. For some embodiments, the timeseries archiver 120 may be configured with multiple worker threads, in which timeseries data per device 102, based on the device ID, on each worker thread.

The timeseries purger 122 drops one or more partitions of the timeseries data for a configured period, some time after archival, at the same or different times, of all timeseries data in the partition(s). The timeseries purger 122 receives archive data from the track table 128 via incoming purge link 144 and sends purge commands to the data table 112 via outgoing purge link 126. The configured period may be stored at the datastore 108 or the timeseries purger 122.

For some embodiments, the data processing system 100 may include a message broker 146 to provide timeseries messages to the timeseries consumer 104. For such embodiments, the message broker 146 would be a service from which the timeseries consumer 104 fetches messages with timeseries data. Devices 102 send their timeseries data for processing via an adaptor service, which converts this data into messages with service point IDs as keys. For example, each message may contain data for one service point but may contain one or more reads for any number of measurements. The messages may be sent to a standard message broker, such as Kafka, ActiveMQ, etc., into a single topic/queue partitioned by a message key hash (service point ID hash).

Figure 2A:
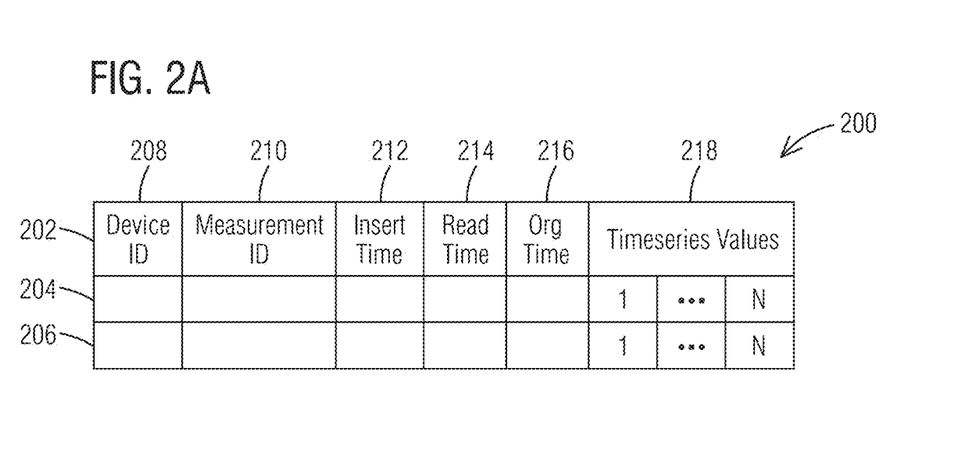
FIGS. 2A-2C depict example illustrations of the data table, the track table, and the milestone table, respectively, of the data store of FIG. 1.

Referring to FIG. 2A, there is shown a conceptual representation of a data table 200 depicting an example embodiment of the data table 112 of FIG. 1. The data table 200 is used to persist timeseries data, and the representation shown in FIG. 2A depicts by example a header 202 as well as a row 204, 206 corresponding to each record of the data table. The data table 200 includes four data types and may optionally include additional data types 216, 218 associated with other identification, timing, and/or values. In particular, the data table 200 includes a device identification 208, a measurement identification 210, an insert time 212, and a read time 214, in which the data table is indexed by the device identification, the insert time, and the read time. The device identification 208 is a service point identification associated with the device 102, such as an energy meter. The measurement identification 210 is a unique identifier for the corresponding measurement of the device 102. The insert time 212 is a timestamp associated with an ingest or write event of the timeseries data to the data table 200. The read time 214 is a timestamp associated with a read event of the timeseries data from the data table 200. The insert time 212 and the read time 214 are synchronized with each other as well as timestamps of the track and milestone tables 128, 130. For example, all timestamps of the datastore 108 may be in coordinated universal time (UTC). As referenced above, each record of the data table 200 may include one or more additional data types, such as an organization identification 216 and/or a timeseries value 218. The organization identification 216 is a unique identifier of an organization or entity associated with ownership of the corresponding device. The timeseries value or values 218 may be measurements associated with a corresponding device and measurement identification.

The content of the data table 200 may be quite substantial. For example, the data table 200 may receive millions or billions of records per day and may keep records for several days. Specifically, if there are 1,000,000 devices each reporting data on five different measurements every fifteen minutes, then the total number of records per day may be 1 mil×5 ch×4 rec/hr×24 hr=480 million records per day.

The records of the data table 200 may be inserted frequently or continuously by the timeseries consumer 104, soon after they are reported by devices 102. The archival or querying function of the timeseries archiver 120 may occur concurrently with the insert function to the data table 200 at configured time intervals. The data removal function by the timeseries purger 122 may also occur concurrently as scheduled by the data processing system 100, such as once-a-day or as otherwise configured. The data table 200 is partitioned by the insert time 212 by time range. As stated above, the time range may be based on minutes, hours, days, weeks, months, and the like. As a result, the archival queries use different partitions than ongoing inserts which, for some embodiments, removes any block and latch contention and makes operations efficient. Also, the archived partitions may be safely dropped with assured data integrity and no data loss.

Figure 2B:
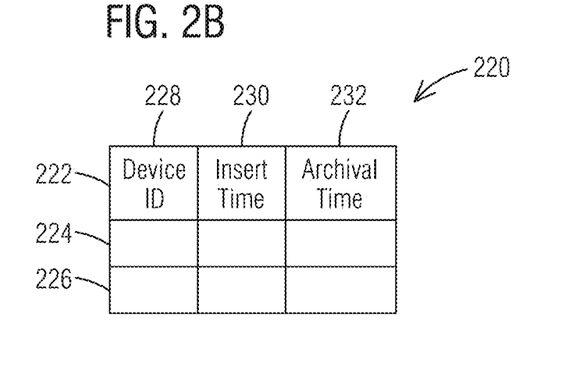

Referring to FIG. 2B, there is shown a conceptual representation of a track table 220 depicting an example embodiment of the meter track table 128 of FIG. 1. The track table 220 includes tracking data per service point, i.e., device 102, that is used to verify that all data within a partition has been archived, and the representation shown in FIG. 2B depicts by example a header 222 as well as a row 224, 226 corresponding to each record of the track table. The track table 220 includes three data types associated with other identification, timing, and/or values. In particular, the track table 220 includes a device identification 228, an insert time 230, and an archival time 232, in which the track table is indexed by the device identification and the archival time. The device identification 228 is a service point identification associated with the device 102, such as an energy meter. The insert time 230 is a timestamp serving as an indicator that new timeseries data has been received by the data table 112, 200 after the last archival by the timeseries archiver 120. The archival time 232 is a timestamp associated with an insert time of the oldest record archived for the corresponding device 102 or measurements of the device in the latest archived batch. The insert time 230 and the archival time 232 are synchronized with each other as well as timestamps of the data and milestone tables 112, 200, 130. For example, all timestamps of the datastore 108 may be in coordinated universal time (UTC).

The total record count for the track table 220 is equal to a Meter identification count. The records are never deleted and are updated once per archival and once per data ingestion after archival. The device identification index is used by the timeseries consumer 104 and timeseries archiver 120 when they query and update the track table 220 per meter identification 228. The archival time, as indexed, is used by the timeseries purger 122 which counts records based on the archival time 232.

Figure 2C:
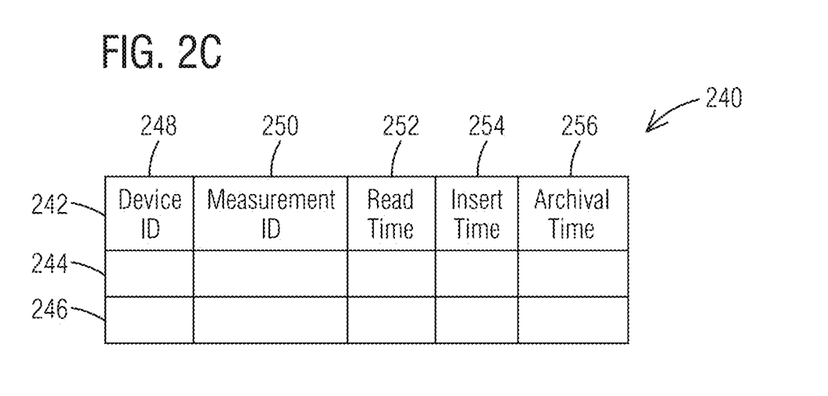

Referring to FIG. 2C, there is shown a conceptual representation of a milestone table 240 depicting an example embodiment of the meter measurement milestone table 130 of FIG. 1. The milestone table 240 includes archival data per device, as well as per measurement, that is used to avoid duplicate archival per measurement type. The representation shown in FIG. 2C depicts by example a header 242 as well as a row 244, 246 corresponding to each record of the milestone table 240, in which the milestone table 240 includes five data types associated with other identification, timing, and/or values. In particular, the milestone table 240 includes a device identification 248, a measurement identification 250, a read time 252, an insert time 254, and an archival time 256, in which the milestone table is indexed by the device identification and the measurement identification. The device identification 248 is a service point identification associated with the device 102, such as an energy meter. The measurement identification 250 is a unique identifier for the corresponding measurement of the device 102. The read time 252 is the latest read time archived for the device and measurement. The insert time 254 is the insert time of the record with the read time 252, i.e., the value of the insert time of the record whose read time is recorded in the read time 252. The archival time 256 is a timestamp associated with the archival of timeseries data by the timeseries archiver 120. The read time 252, the insert time 254, and the archival time 256 are synchronized with each other as well as timestamps of the data and track tables 112, 200, 128, 220. For example, all timestamps of the datastore 108 may be in coordinated universal time (UTC).

The record count of the milestone table 240 is equal to the count of the meter identification multiplied by the count of the measurement identification. For instance, if there are one million devices each with five different measurement types, then the total number of records will be 5 million. The records are never deleted and are updated once per archival.

Figure 3:
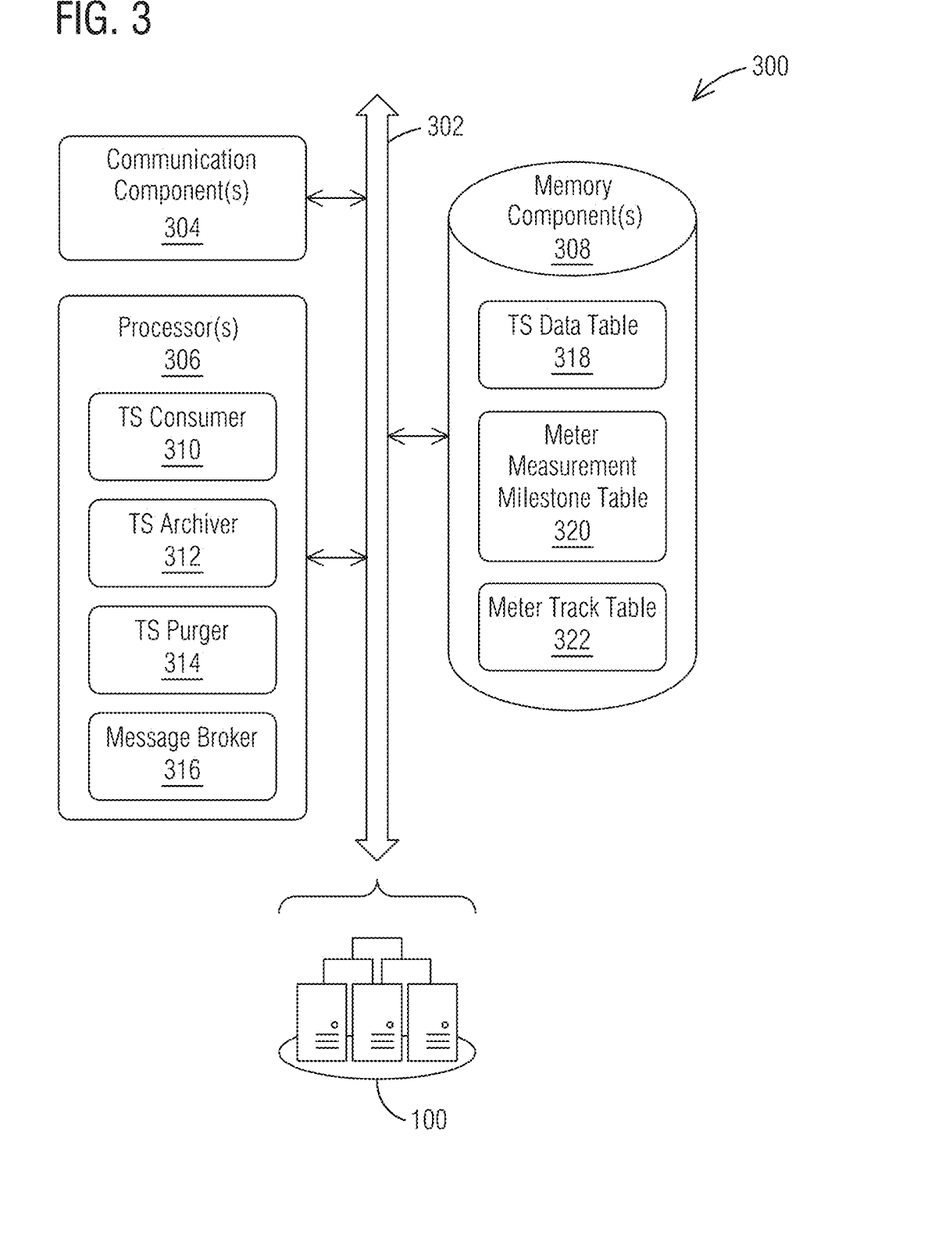
FIG. 3 is a block diagram of an example network server implementation of the data processing system of FIG. 1.

Referring to FIG. 3, there is shown a block diagram of an example network server implementation of the data processing system. It is to be understood that FIG. 3 is provided for illustrative purposes only to represent examples of components 300 of a data processing system 100 and is not intended to be a complete diagram of the various components that may be utilized by the system. Therefore, the data processing system 100 may include multiple services or computing devices, such as a cloud computing environment. The data processing system 100 may also include various other components not shown in FIG. 3, a combination of two or more components, or a division of a particular component into two or more separate components, and still be within the scope of the present invention.

The components 300 of the data processing system 100 comprise a communication network 302 for interconnecting other components directly or indirectly. The other components include one or more communication components 304 communicating with other entities via a wired or wireless network, one or more processors 306, and one or more memory components 308. The communication components 304 of the system are configured to communicate with a communication components of other devices, such as devices 102, external system 142, message broker 146, and devices internal to the system 100.

The processors 306 may execute code and process data received other components of the components 300, such as information received at the communication components 304 or stored at the memory components 308. The code associated with the data processing system 100 and stored by the memory components 308 may include, but are not limited to, operating systems, modules, drivers, and the like. An operating system includes executable code that controls basic functions of the system, such as interactions among the various components 300, communication with external devices via the communication components 304, and storage and retrieval of code and data to and from the memory components 308.

Each module includes executable code to provide specific functionality for the processors 306 and/or remaining components of the system 100. Examples of modules of the processors 306 include, but are not limited to, a timeseries consumer 310, a timeseries archiver 312, a timeseries purger 314, and a message broker 316. Data stored at the memory components 308 is information that may be referenced and/or manipulated by an operating system or modules for performing functions of the system. Examples of data associated with the data processing system 100 and stored by the memory components 308 may include, but are not limited to, a timeseries data table 318, a meter measurement milestone table 320, and a meter track table 322.

Figure 4:
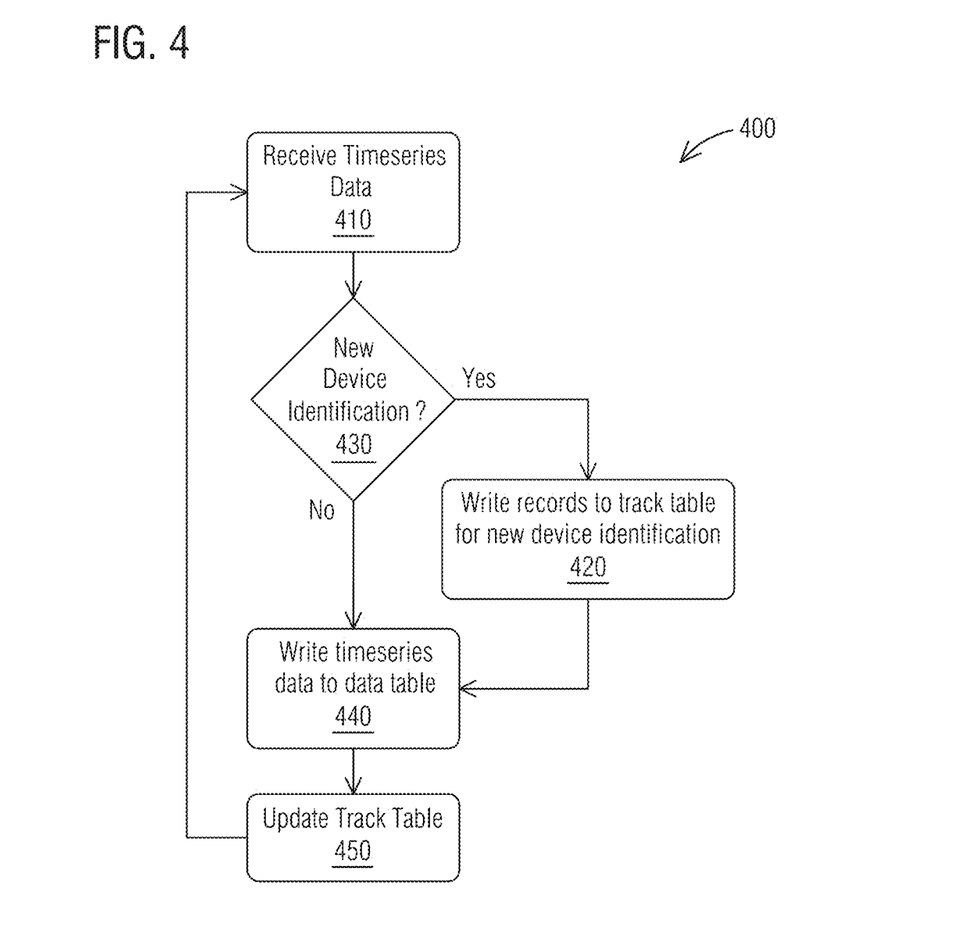
FIGS. 4, 5 and 6 are flow diagrams of an example operation of the data processing system of FIG. 1.
Figure 5:
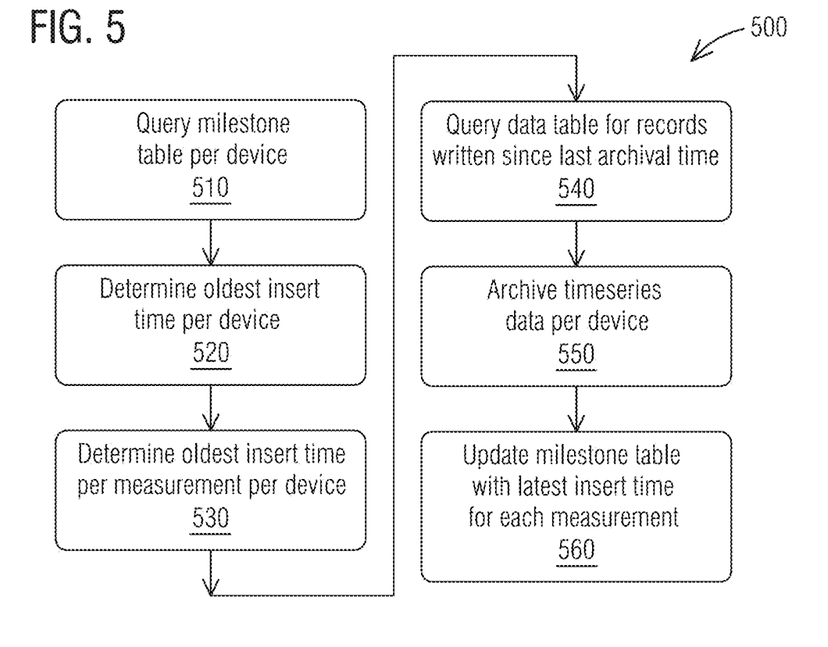
Figure 6:
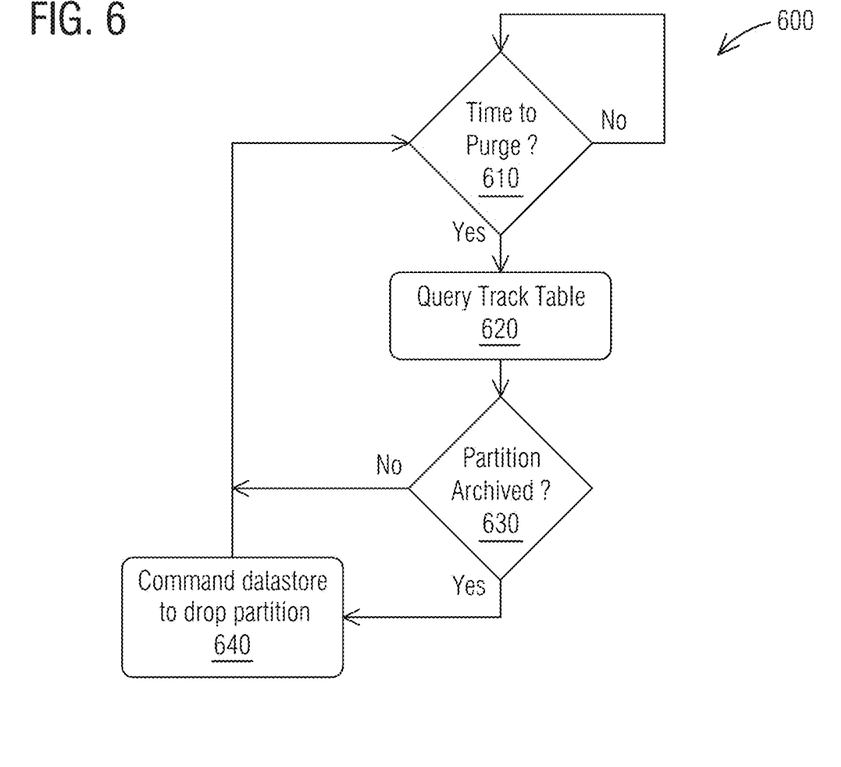

Referring to FIGS. 4, 5, and 6, there are shown flow diagrams of an example operation of the data processing system 100, in which timeseries data is organized and processed for highly efficient write-read-remove functions. FIG. 4 represents the example consumer operation 400 of the timeseries consumer 104, FIG. 5 represents the example archiver operation 500 of the timeseries archiver 120, and FIG. 6 represents the example purger operation 600 of the timeseries purger 122. The method of managing time series data comprises operations performed by the timeseries consumer 104, the timeseries archiver 120, and the timeseries purger 122.

Referring specifically to FIG. 4, the example consumer operation 400 is initiated by receiving timeseries data from multiple devices (410), such as energy meters. The timeseries data is repeatedly received by the timeseries consumer service (i.e., timeseries consumer 104). The timeseries data is received via messages by the timeseries consumer 104. For some embodiments, this service constantly polls the message broker 146 and fetches a batch of messages at a time, such as several hundred messages. The service has a configurable amount of message consumer threads, and each thread fetches messages from a discrete set of partitions. Although messages for any device identification may be written to a single partition, it is possible for more than one thread to process messages for the same device identification, for a short period of time or otherwise. This situation may occur on partition rebalance caused by a delay in a message offset commit, which may be triggered, for instance, by a slow response the datastore 108. On a rebalance the partition may be assigned to a different consumer process/thread, and the same (still uncommitted) messages are fetched again by another thread while this thread is still processing these messages. Therefore, the implementation must handle possible duplicates.

The timeseries consumer 104 writes records into track table 128 for newly introduced device identifications (420) before writing the timeseries data into the data table 112. The timeseries consumer 104 sets the insert timestamp value to the current time less a predetermined value, such as <current time less several seconds>. This ensures that, for the initial timeseries data for a device, the track table 128 contains the insert time 230 of a value which is not greater than the archival time 232. This handling supports the use case scenario when the timeseries archiver 120 queries the timeseries data from the data table 112 responsively (e.g., immediately or promptly) after it had been written by the consumer 104. Thus, the timeseries consumer 104 records metadata associated with the timeseries data provided to the particular partition at the track table with the initial insert value in the track table set to support responsive, such as immediate or prompt, data archival. The consumer 104 identifies new devices based on an in-memory cache of timeseries consumer (430). The timeseries consumer 104 may maintain the local in-memory cache of device identifications to facilitate an efficient update of the track table 128. This cache, i.e., track cache, may be implemented as a ConcurrentHashMap and include insert timestamps per device identification. It may be used to periodically query the track table 128 for the sign of a new archival and then to mark the record or row in this table to indicate that there is new timeseries data.

The timeseries data is provided to a particular partition of multiple partitions 114, 116, 118 of the data table 112 based on an insert time of the timeseries data to the data table. In particular, the timeseries data is written to the particular partition 114, 116, 118 having a time range corresponding to the insert time of the timeseries data. The data table 112, 200 includes a device identification 208, a measurement identification 210, an insert time 212, and a read time 214 for each device record. The data table 112 may also include one or more timeseries values 218 for each device record.

The timeseries consumer 104 writes the timeseries data into the data table 112 (440). For some embodiments, the timeseries data may be written in response to the timeseries consumer 104 or the datastore 108 receiving the data. The datastore 108 writes records into partitions as time progresses. For example, the records or rows may be written to a first partition 114 during a first time period of service run time, the records or rows may be written to as second partition 116 during the second time period of service run time, and so on.

In response to providing the timeseries data to the particular partition (440), metadata associated with the timeseries data is recorded at the track table 128 (450), with the initial insert value in the track table being set to support responsive (e.g., immediate or prompt) data archival. In particular, the insert time of the timeseries data may be written to the data table 112 as well as to the track table 128. The timeseries consumer 104 updates the track table 128 for those device identifications whose records indicate archival since the last update by the timeseries consumer. This update may be performed on a periodic basis, such as once an hour. The track table 128 includes a device identification 228, an insert time 230, and an archival time 232 for each device record.

It is important to note that the insert time of the track table 128 is used as an indicator of new reads after the last archival. The insert time should be greater than archival time, but the precise value is not important. The indication of new reads after the last archival is needed to make the correct decision on when partitions 114, 116, 118 may be dropped. The track table 128 is queried to determine whether there are any devices 102 with timeseries data inserted after the last archival. By using mere indications and avoiding actual insertion time, the design and implementation complexity of the data processing system 100 is dramatically reduced since it is possible for more than one thread to process timeseries data for a given device 102.

The timeseries data may be written to the data table 112 in the same transaction as the update to the track table 128, or these operations may be executed in different transactions. If the timeseries consumer 104 crashes before it updates the track table 128, then there is no data loss as the message offset won't be committed and the messages will be reprocessed.

Referring to the example archiver operation 500 of FIG. 5, the timeseries archiver 120 identifies recent records of the data table 112 based on one or more insert times and one or more archival times of a milestone table 130 (510, 520, 530, 540). The milestone table 130, 240 includes a device identification 248, a measurement identification 250, an insert time 252, a read time 254, and an archival time 256 for each device record. The timeseries archiver 120 determines the recent records based on the timeseries data that has been inserted since the last archival time. In particular, on schedule, the timeseries archiver 120 queries the milestone table 130 per device identification (510). By querying the milestone table 130, the timeseries archiver 120 determines the oldest insert time value to use in the query of data table 112 per device identification (520) as well as the oldest insert time values per each measurement within the device identification (530). The timeseries archer 120 then queries the data table 112 for records written since the last archival time per device identification (540).

In response to identifying recent records of the data table 112, the timeseries archiver 120 archives the timeseries data of the data table associated with the recent records to an external system on a per device identification basis (550). The timeseries archiver 120 then updates one or more archival times of the milestone table 130 as well as the archival time or times of the track table 128 (560) in response to archiving the timeseries data of the data table (550). The timeseries archiver 120 writes the archival time of the timeseries data that has been archived. Specifically, the timeseries archiver 120 updates the milestone table 130 with the latest insert time for each updated measurement and updates the track table 128 with the oldest insert time of the archived data per device identification. The milestone archival time is the most recent timestamp value of the archived records, and the track archival time is the oldest timestamp value. For some embodiments, if the device identification record is not present in the track table 128, then the device identification record is created with an insert time value set to a nominal value, such as one second less than the archival time value.

Referring to FIG. 6, the example purger operation 600 drops an archived partition of the data table in response to determining that all records of the archived partition have been archived. For some embodiments, the timeseries purger 122 or the data processing system 100 determine whether to initiate the purge operation 600 (610). Whether the purge operation 600 is initiated by determination or in response to another event, the timeseries purger 122 queries the track table 128 (620). Based on the information of the track table 128, the timeseries purger 122 verifies whether there are device identifications that have data within a predetermined or configured purge threshold that has not yet been archived (630). If there is any data of a particular partition that has not been archived, then the purger operation 600 does not drop the particular partition from the data table 122 at that time. If, on the other hand, all data has archived for device identifications of a partition, then the timeseries purger 122 drops this archived partition of the data table 122. The timeseries purger 122 drops the archived partition as an I/O-less transaction, which would not allow the data processing system 100 to recover the data of the dropped partition. Even so, there is no data loss for the data processing system 100 since all data has been securely archived by the system, so the system benefits from the efficient operation of purging the partition. The timeseries purger 122 may command the datastore 108 to drop the archived partition for some embodiments, and the timeseries purger 122 may directly drop the archived partition for some embodiments.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for managing timeseries data including a processor and a memory component comprising:
   a timeseries consumer of the processor configured to receive timeseries data from a plurality of devices, provide the timeseries data to a particular partition of a plurality of partitions of a data table associated with at least one insert time of the timeseries data inserted to the data table, and record metadata associated with the timeseries data provided to the particular partition at a track table, the track table including tracking information to identify whether all timeseries data has been archived;
   a timeseries archiver of the processor configured to identify recent records of the data table to minimize a number of queries to the data table, archive the timeseries data of the data table associated with the recent records to an external system, and update a milestone table and the track table, the time series archiver identifies the recent records by:
      determining, based on the milestone table, time values to use in a query of the data table; and
      querying the data table, based on the determined time values, for timeseries data inserted since a last archival time per device; and
   a timeseries purger of the processor configured to drop an archived partition of the data table based on determining that all records of the archived partition have been archived.

2. The system as described in claim 1, wherein the timeseries consumer writes the timeseries data to the particular partition having a time range corresponding to the insert time of the timeseries data.

3. The system as described in claim 1, wherein the data table includes a device identification, a measurement identification, an insert time, and a read time for each device record.

4. The system as described in claim 3, wherein the data table includes at least one timeseries value for each device record.

5. The system as described in claim 1, wherein the track table includes a device identification, an insert time, and an archival time for each device record.

6. The system as described in claim 1, wherein the milestone table includes a device identification, a measurement identification, an insert time, a read time, and an archival time for each device record.

7. The system as described in claim 1, wherein the timeseries consumer writes the insert time of the timeseries data to the data table to the track table.

8. The system as described in claim 1, wherein the timeseries archiver determines the recent records based on the timeseries data that has been inserted since a last archival time.

9. The system as described in claim 1, wherein the timeseries archiver writes an archival time of the timeseries data that has been archived to the track table and the milestone table.

10. The system as described in claim 1, wherein the timeseries purger drops the archived partition without allowing recovery of data of a dropped partition.

11. The system as described in claim 1, wherein:
the timeseries archiver updates the milestone table with a time value of archived data for each measurement, and
the timeseries archiver updates the track table with a time value of archived data for each device.

12. A method for managing time series data comprising:
receiving timeseries data from a plurality of devices;
providing the timeseries data to a particular partition of a plurality of partitions of a data table associated with at least one insert time of the timeseries data inserted to the data table;
recording metadata associated with the timeseries data at a track table in response to providing the timeseries data to the particular partition, the track table includes tracking information to identify whether all timeseries data has been archived;
identifying recent records of the data table to minimize a number of queries to the data table comprising:
determining, based on a milestone table, time values to use in a query of the data table; and
querying the data table, based on the determined time values, for timeseries data inserted since a last archival time per device;
archiving the timeseries data of the data table associated with the recent records to an external system;
updating the milestone table and the track table in response to archiving the timeseries data of the data table; and
dropping an archived partition of the data table in response to determining that all records of the archived partition have been archived.

13. The method as described in claim 12, wherein providing the timeseries data to the particular partition includes writing the timeseries data to the particular partition having a time range corresponding to the insert time of the timeseries data.

14. The method as described in claim 12, wherein the data table includes a device identification, a measurement identification, an insert time, and a read time for each device record.

15. The method as described in claim 14, wherein the data table includes at least one timeseries value for each device record.

16. The method as described in claim 12, wherein the track table includes a device identification, an insert time, and an archival time for each device record.

17. The method as described in claim 12, wherein the milestone table includes a device identification, a measurement identification, an insert time, a read time, and an archival time for each device record.

18. The method as described in claim 12, wherein recording the metadata associated with the timeseries data at the track table includes writing the insert time of the timeseries data to the data table to the track table.

19. The method as described in claim 12, wherein identifying the recent records of the data table includes determining the recent records based on the timeseries data that has been inserted since a last archival time.

20. The method as described in claim 12, wherein updating the at least one archival time of the track table and the milestone table includes writing an archival time of the timeseries data that has been archived.

21. The method as described in claim 12, wherein dropping the archived partition of the data table includes dropping the archived partition without allowing recovery of data of a dropped partition.

22. The method as described in claim 12, wherein:
updating the milestone table with a time value of archived data for each measurement; and
updating the track table with a time value of archived data for each device in response to archiving the timeseries data of the data table.

23. The system as described in claim 1, wherein the time values include a time value for each device and a time value for each measurement of each device.

24. The method as described in claim 12, wherein the time values include a time value for each device and a time value for each measurement of each device.

* * * * *